US011163699B2

(12) United States Patent
Keller et al.

(10) Patent No.: US 11,163,699 B2
(45) Date of Patent: Nov. 2, 2021

(54) MANAGING LEAST RECENTLY USED CACHE USING REDUCED MEMORY FOOTPRINT SEQUENCE CONTAINER

(71) Applicant: EMC IP Holding Company LLC, Hopkinton, MA (US)

(72) Inventors: Itay Keller, Tel Aviv (IL); Zohar Lapidot, Tel Aviv (IL); Neta Peleg, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 80 days.

(21) Appl. No.: 16/834,363

(22) Filed: Mar. 30, 2020

(65) Prior Publication Data

US 2021/0303480 A1 Sep. 30, 2021

(51) Int. Cl.
*G06F 12/123* (2016.01)
*G06F 12/0817* (2016.01)
(Continued)

(52) U.S. Cl.
CPC ........ *G06F 12/123* (2013.01); *G06F 12/0824* (2013.01); *G06F 12/0835* (2013.01); *G06F 12/0871* (2013.01); *G06F 12/0891* (2013.01); *G06F 2212/1021* (2013.01); *G06F 2212/466* (2013.01)

(58) Field of Classification Search
CPC ............. G06F 12/0824; G06F 12/0835; G06F 12/0871; G06F 12/0891; G06F 12/123; G06F 2212/1021; G06F 2212/466
See application file for complete search history.

(56) References Cited

U.S. PATENT DOCUMENTS 5,381,539 A   1/1995  Yanai et al.
5,551,003 A   8/1996  Mattson et al.
              (Continued)

FOREIGN PATENT DOCUMENTS

WO  PCT/US2019/024885   1/2020
WO  PCT/US2019/024900   1/2020

OTHER PUBLICATIONS

Dell EMC, "Dell EMC VxRack FLEX," Dell EMC Product Overview, 2018, 5 pages.
(Continued)

*Primary Examiner* — Aracelis Ruiz
(74) *Attorney, Agent, or Firm* — Ryan, Mason & Lewis, LLP (57) ABSTRACT

Techniques are provided for managing a least recently used cache using a linked list with a reduced memory footprint. A cache manager receives an I/O request comprising a target address, wherein the cache manager manages a cache memory having a maximum allocated amount of cache entries, and a linked list having a maximum allocated amount of list elements which is less than the maximum allocated amount of cache entries. If the target address does correspond to a cache entry, the cache manager accesses the cache entry to obtain the cache data from cache memory, removes a list element from the linked list, which corresponds to the accessed cache entry, selects an existing cache entry which currently does not have a corresponding list element in the linked list, and adds a list element to a head position of the linked list which corresponds to the selected cache entry.

20 Claims, 6 Drawing Sheets

(51) Int. Cl.
*G06F 12/0891* (2016.01)
*G06F 12/0831* (2016.01)
*G06F 12/0871* (2016.01)

(56) References Cited

U.S. PATENT DOCUMENTS

| | | | |
|---|---|---|---|
| 5,764,880 | A | 6/1998 | Gerdt et al. |
| 6,052,799 | A | 4/2000 | Li et al. |
| 6,941,420 | B2 | 9/2005 | Butterworth et al. |
| 8,843,676 | B2 | 9/2014 | Rajamanickam et al. |
| 9,372,751 | B2 | 6/2016 | McNutt |
| 9,460,025 | B1 * | 10/2016 | Wallace ............ G06F 12/0871 |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 2002/0032835 | A1 | 3/2002 | Li et al. |
| 2006/0085601 | A1 * | 4/2006 | Woffinden ............ G06F 12/121 711/133 |
| 2008/0021853 | A1 | 1/2008 | Modha et al. |
| 2009/0204761 | A1 | 8/2009 | Caprioli et al. |
| 2012/0324171 | A1 * | 12/2012 | Benhase ............ G06F 12/0866 711/136 |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.
Dell EMC, "EMC ScaleIO Basic Architecture Documentation," Technical White Paper, Mar. 2017, 22 pages.
Emc2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 12 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," HPCA, 10.1109/2006. 1598129, pp. 200-211.
Wikipedia, "Raft (Computer Science)," https://en.wikipedia.org/wiki/Raft_(computer_science), Feb. 10, 2020, 4 pages.
Wikipedia, "Paxos (ComputerScience)," https://en.wikipedia.org/wiki/Paxos_(computer_science), Dec. 6, 2019, 21 pages.
Wikipedia, "State Machine Replication," https://en.wikipedia.org/wiki/State_machine_replication, Dec. 14, 2019, 9 pages.
U.S. Appl. No. 16/343,942 filed in the name of Yonatan Shtarkman et al., filed Apr. 22, 2019, and entitled "Snapshot-Enabled Storage System Implementing Algorithm for Efficient Reclamation of Snapshot Storage Space."
U.S. Appl. No. 16/343,949 filed in the name of Asaf Porath et al., filed Apr. 22, 2019, and entitled "Snapshot-Enabled Storage System Implementing Algorithm for Efficient Reading of Data from Stored Snapshots."
U.S. Appl. No. 16/807,709 filed in the name of Avi Puder et al., filed Mar. 3, 2020, and entitled "Management of Shared Resources in a Software-Defined Storage Environment."
U.S. Appl. No. 16/822,818 filed in the name of Itay Keller et al., filed Mar. 18, 2020, and entitled "Storage System Implementing Snapshot Longevity Ranking for Efficient Management of Snapshots."
U.S. Appl. No. 16/822,848 filed in the name of Itay Keller et al., filed Mar. 18, 2020, and entitled "Assignment of Longevity Ranking Values of Storage Volume Snapshots Based on Snapshot Policies."
U.S. Appl. No. 16/823,813 filed in the name of Itay Keller et al., filed Mar. 19, 2020, and entitled "Managing Incompressible Data in a Compression-Enabled Log-Structured Array Storage System."
U.S. Appl. No. 16/830,469 filed in the name of Roi Tagar et al., filed Mar. 26, 2020, and entitled "Storage Block Balancing Using Volume Part Migration."
U.S. Appl. No. 16/830,473 filed in the name of Yugal Peleg Lieblich et al., filed Mar. 26, 2020, and entitled "Replicated State Cluster with Standby Node State Assessment During Leadership Transition."
U.S. Appl. No. 16/830,946 filed in the name of Gil BenZeev et al., filed Mar. 26, 2020, and entitled "Storage Volume Migration Scheduling Based on Storage Volume Priorities and Specified Constraints."
U.S. Appl. No. 16/832,763 filed in the name of Michal Yarimi et al., filed Mar. 27, 2020, and entitled "Managing Storage Device Errors During Processing of Inflight Input/Output Requests."

* cited by examiner

MANAGING LEAST RECENTLY USED CACHE USING REDUCED MEMORY FOOTPRINT SEQUENCE CONTAINER

FIELD

This disclosure relates generally to cache memory management techniques and, more specifically, to techniques for managing least recently used cache memory in a data storage system.

BACKGROUND

Computing systems and data storage systems typically implement caching methods that utilize one or more levels of cache memory to store data so that future requests for such data can be served faster. Cache memory includes various types of caches such as write caches, read caches, etc. The data that is stored in cache memory can be values that have been previously computed and stored in cache (e.g., write-back cache) or copies of original data that are accessed from a slower performance storage device and temporarily stored in cache memory (e.g., read cache) to accelerate the fulfillment of future requests for the data. If an input/output (I/O) request is received for data that is present in cache memory (referred to as a "cache hit"), the I/O request can be served by reading the cache memory, which is comparatively faster. On the other hand, if the requested data is not present in the cache memory (referred to as a "cache miss"), the data has to be recomputed or fetched from its original storage location, which is comparatively slower. Therefore, a faster overall system performance can be achieved by increasing the number of I/O requests that are served from cache memory.

In response to a cache miss, the storage system may evict an existing cache entry to provide room for a new cache entry for the newly requested data. In this instance, an existing cache entry can be evicted and reused to store new data. The heuristic which is used to select a cache entry to evict is known as the cache eviction or cache replacement policy. An effective cache eviction policy is configured to maintain frequently used ("hot") data in cache memory while evicting data from the cache memory that are infrequently or never accessed ("cold"). A commonly used eviction policy, referred to as "least recently used" (LRU), replaces a least recently used cache entry (e.g., cache line), with the assumption that more recently used cache entries are more likely to soon be used again.

Conventionally, an LRU mechanism is implemented by maintaining a sequence container which comprises a linked list of elements (e.g., singly linked list or doubly linked list), wherein each linked list element is mapped (i.e., logically linked) to a cache entry. When a cache entry is accessed, its corresponding linked list element is moved to a head position of the linked list so that an ordered list of cache elements is maintained based on access time, wherein a tail element of the linked list corresponds to the LRU cache entry that is chosen for eviction when necessary. A conventional implementation of an LRU linked list requires that the number of list elements in the linked list be equal to the number of cache elements. In this regard, while a conventional LRU eviction mechanism is effective in cases where the cached data (e.g., data records, pages, etc.) are sufficiently large as compared to the overhead (in terms of memory size) required to maintain the LRU linked list, such overhead becomes significantly costly in terms of memory utilization when the size of the cached data records is significantly small in comparison to the size of the memory required to maintain the LRU linked list.

SUMMARY

Exemplary embodiments of the disclosure generally include techniques for managing LRU cache memory using a sequence container (e.g., linked list) with a reduced memory footprint. For example, one exemplary embodiment includes a process that is implemented by a cache management system. The cache management system receives an I/O request comprising a target address for accessing data, wherein the cache management system manages a cache memory having a maximum allocated amount of cache entries, and a linked list data structure having a maximum allocated amount of list elements, wherein the maximum allocated amount of list elements is less than the maximum allocated amount of cache entries. The cache management system commences a cache access operation to determine whether the target address corresponds to a cache entry. In response to determining that the target address does correspond to a cache entry, the cache management system (i) accesses the cache entry to obtain cache data from cache memory and return the obtained cache data to a requesting cache client, (ii) removes a list element from the linked list data structure, wherein the removed list element corresponds to the accessed cache entry, (iii) selects an existing cache entry which currently does not have a corresponding list element in the linked list data structure, and (iv) adds a list element to a head position of the linked list data structure which corresponds to the selected cache entry.

Other embodiments of the disclosure include, without limitation, apparatus, and articles of manufacture comprising processor-readable storage media for LRU cache memory.

DETAILED DESCRIPTION

Exemplary embodiments will be described herein with reference to illustrative information processing systems (e.g., data storage systems) comprising associated computers, servers, storage devices and other processing devices, which are configured to implement and manage LRU cache memory using a low memory footprint sequence container. It is to be appreciated, however, that these and other exemplary embodiments are not restricted to the particular illustrative system and device configurations shown in the figures. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1A:
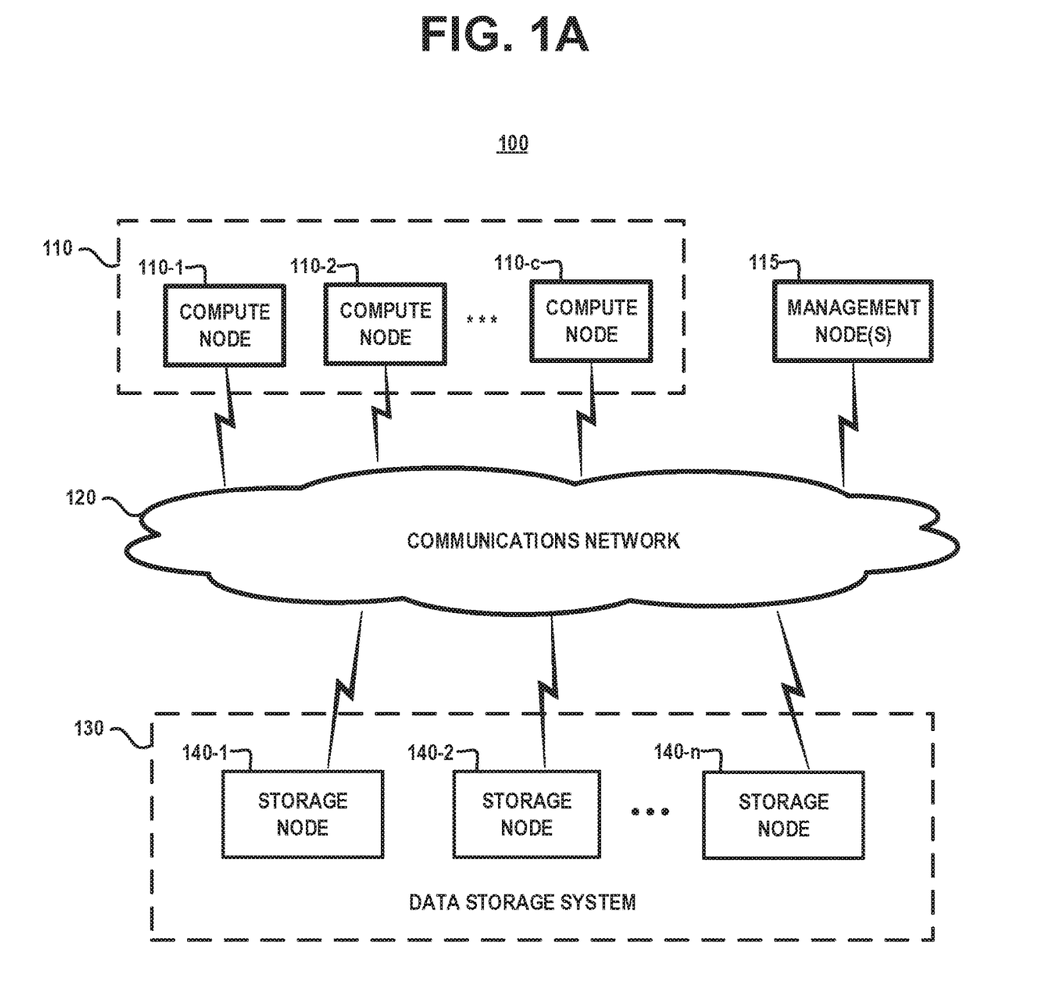
FIGS. 1A and 1B schematically illustrate an information processing system comprising a data storage system which is configured to manage an LRU cache memory using a low memory footprint sequence container, according to an exemplary embodiment of the disclosure.
Figure 1B:
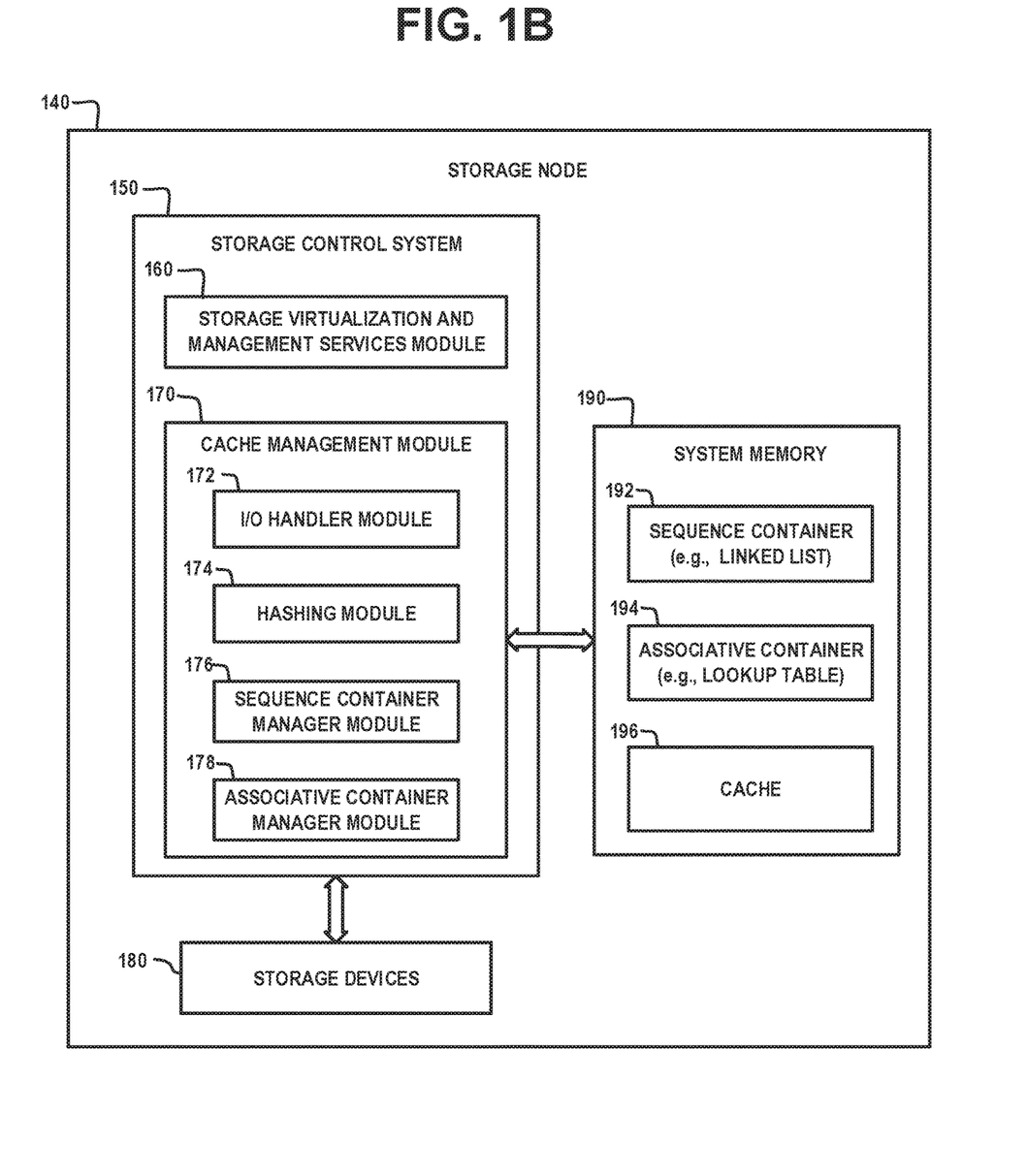

FIGS. 1A and 1B schematically illustrate an information processing system comprising a data storage system which is configured to manage an LRU cache memory using a low memory footprint sequence container, according to an exemplary embodiment of the disclosure. More specifically, FIG. 1A schematically illustrates an information processing system 100 which comprises a plurality of compute nodes 110-1, 110-2, . . . , 110-c (collectively referred to as compute nodes 110), one or more management nodes 115, a communications network 120, and a data storage system 130. The data storage system 130 comprises a plurality of storage nodes 140-1, 140-2, . . . , 140-n (collectively referred to as storage nodes 140, or each singularly referred to as storage node 140). In the context of the exemplary embodiments described herein, the storage nodes 140 of the data storage system 130 implement cache management systems that are configured to manage LRU cache memory using a low memory footprint sequence container. As explained in further detail below, an LRU eviction scheme is implemented which significantly reduces the memory footprint of implementing and maintaining a sequence container (e.g. doubly linked list) for LRU cache memory in which the cached data (e.g., small metadata records) are relatively small in comparison to the amount of memory that is needed to maintain the LRU sequence container. FIG. 1B schematically illustrates an exemplary framework of at least one or more of the storage nodes 140.

In particular, as shown in FIG. 1B, the storage node 140 comprises a storage control system 150 comprising a storage virtualization and management services module 160, a cache management module 170, storage devices 180, and system memory 190. The cache management module 170 comprises an I/O handler module 172, a hashing module 174, a sequence container manager module 176, and an associative container manager module 178, the functions of which will be described in further detail below. The system memory 190 is configured to implement an LRU cache system comprising a sequence container 192 (e.g., a linked list), an associative container 194 (e.g., a hash lookup table), and a block of memory that is allocated as cache memory 196. The cache management module 170 is configured to perform cache access operations in response to I/O requests (write and read requests), loading/destaging data to/from the cache 196, managing the LRU data structures (e.g., 192 and 194), etc. It is to be noted that the cache management system 170 may include additional modules and other components that are typically included in various implementations of cache management systems, depending on the application. It is to be further noted that the storage control system 150 may include additional modules and other components that are typically included in various implementations of storage control systems (e.g., software-defined storage systems), although such additional modules and other components are omitted for clarity and simplicity of illustration.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue I/O requests that are processed by a corresponding one of the storage nodes 140. The term I/O request as used herein refers to at least one of input and output. For example, an I/O request may comprise a write request and/or a read request directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly construed and not viewed as being limited to storage systems of any particular type or types. A storage system in some embodiments can be implemented using a combination of storage nodes and compute nodes. In some embodiments, the storage nodes 140 comprise storage server nodes (e.g., server node 400, shown in FIG. 4) having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed as a server node (e.g., physical server machine) with local persistent storage devices (e.g., HDDs, SSDs, etc.) and a storage control system that is configured to manage and control access to the local persistence storage devices. A storage node may comprise one or more compute nodes to process data and execute tasks/workloads.

In some embodiments, as schematically illustrated in FIG. 1B, the storage node 140 is a physical server node or storage appliance, wherein the storage devices 180 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 180 may be implemented in the storage node 140. In this regard, the term "storage device" as used herein is intended to be broadly construed, so as to encompass, for example, SSDs, HDDs, flash drives, hybrid drives or other types of storage media. The data storage devices 180 are connected to the storage node 140 through any suitable host interface, e.g., a host bus adapter, using suitable protocols such as ATA, SATA, eSATA, NVMe, SCSI, SAS, etc. In other embodiments, the storage node 140 can be network connected to one or more NAS nodes over a local area network.

The storage control system 150 is configured to manage the storage devices 180 and control I/O access to the storage devices 180 and/or other storage resources (e.g., DAS or NAS resources) that are directly attached or network-connected to the storage node 140. In some embodiments, the storage control system 150 is a component (e.g., storage data server) of a software-defined storage (SDS) system which supports the virtualization of the storage devices 180 by separating the control and management software from the underlying hardware architecture of the storage devices 180. The storage control system 150 runs on a server operating system of the storage node 140 to provide storage services. More specifically, in a software-defined storage environment, the storage control system 150 comprises a storage data server that is configured to abstract storage access services from the underlying storage hardware, and thereby control and manage I/O requests issued by the compute nodes 110, as well as support networking and connectivity. In this instance, the storage control system 150 comprises a software layer that is hosted by the storage node 140 and deployed in the data path between the compute nodes 110 and the storage devices 180 of the storage node 140, wherein the storage control system 150 is configured to process I/O requests from the compute nodes 110 by accessing the storage devices 180 to store/retrieve data to/from the storage devices 180 based on the I/O requests.

In a software-defined storage environment, the storage control system 150 comprises a storage data server that is installed on each storage node that will contribute its storage to the data storage system. The storage control system 150 is configured to provision, orchestrate and manage the local storage resources (e.g., the storage devices 180) of the storage node 140. For example, the storage control system 150 implements methods that are configured to create and manage storage pools (e.g., virtual pools of block storage) by aggregating capacity from the storage devices 180. The storage control system 150 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In the software-defined storage environment, each of the storage nodes 140 in FIG. 1A can run an instance of the storage control system 150 to convert the respective local storage resources (e.g., DAS storage devices and/or NAS storage devices) of the storage nodes 140 into local block storage. Each instance of the storage control system 150 contributes some or all of its local block storage (HDDs, SSDs, PCIe, NVMe and flash cards) to an aggregated pool of storage of a storage server node cluster (e.g., cluster of storage nodes 140) to implement a server-based SAN (e.g., virtual SAN). In this configuration, each storage node 140 is part of a loosely coupled server cluster which enables "scale-out" of the software-defined storage environment, wherein each instance of the storage control system 150 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage control systems 150 operating as storage data servers to create and expose volumes of a storage layer, the software-defined storage environment comprises other components such as (i) storage data clients that consume the storage layer and (ii) metadata managers that coordinate the storage layer. More specifically, on the client-side (e.g., compute nodes 110), an storage data client (SDC) is a lightweight block device driver that is deployed on each node (e.g., server node) that consumes the shared block storage volumes that are exposed by the storage control systems 150 of the storage nodes 140. In particular, the SDCs run on the same hosts (e.g., servers) as the compute nodes 110 which require access to the block devices that are exposed and managed by the storage control systems 150 of the storage nodes 140. The SDC exposes block devices representing the virtual storage volumes that are currently mapped to that host. In particular, the SDC serves as a block driver for a client (server), wherein the SDC intercepts I/O requests issued by a compute node 110, and utilizes the intercepted I/O request to access the block storage that is managed by the storage control systems 150. The SDC provides the operating system or hypervisor (which runs the SDC) access to the logical block devices (e.g., volumes).

In the software-defined storage environment, the primary data and copies of each storage volume are distributed over the storage nodes 140, and each SDC has knowledge of which SDS data storage server (e.g., storage control system 150) holds its block data, so multipathing can be accomplished natively through the SDCs. In particular, each SDC knows how to direct an I/O request to the relevant destination SDS storage data server (e.g., storage control system 150). In this regard, there is no central point of routing, and each SDC performs is own routing independent from any other SDC. This implementation prevents unnecessary network traffic and redundant SDS resource usage. Each SDC maintains peer-to-peer connections to every storage control system 150 that manages the storage pool so each SDC can communicate over multiple pathways to all of the storage nodes 140 which store the data. The multi-point peer-to-peer communication fashion allows the SDCs to read and write data to and from all points simultaneously, eliminating bottlenecks and quickly routing around failed paths.

The management nodes 115 in FIG. 1A implement a management layer that is configured to manage and configured the storage environment 100. In some embodiments, the management nodes 115 comprise the SDS metadata manager components, wherein the management nodes 115 comprise a tightly-coupled cluster of nodes that are configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that are required for system operation of the SDS environment such as configuration changes, managing the SDS data clients and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyperconverged deployment, a single-layer deployment is implemented in which the storage data clients and storage data servers (e.g., storage control systems 150) run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, the various modules of the storage control system 150 of FIG. 1B collectively provide data storage and management methods that are configured to perform various function as follows. In particular, the storage virtualization and management services module 160 implements any suitable logical volume management (LVM) system which is configured to create and manage local storage volumes by aggregating the storage devices 180 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data. In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module 160 implements methods to support various data storage management services such as data protection, data migration, data deduplication, replication, thin provisioning, snapshots, data backups, etc.

In some embodiments, the storage devices 180 are configured as block storage devices where raw volumes of storage are created and each block can be controlled as, e.g., an individual disk drive by the storage control system 150. Each block can be individually formatted with a same or different file system as required for the given data storage system application. In some embodiments, the cache management module 170 is configured to implement and manage a read cache to reduce a number of I/O operations communicated to and from persistent storage devices 180, which often comprise slower memory, such as HDDs. Further, in some embodiments, the cache management module 170 is configured to implement and manage a write cache (e.g. write-back cache) in which data can be quickly written to the case so that a write-completed status can be issued to the host, before the data is then written back to storage. In some embodiments, the cache management module 170 is configured to implement and manage a write cache of metadata associated with the storage system that is controlled by the storage control system 150, wherein each cached element of metadata is relatively small (e.g., on the order of 8 bytes, 16 bytes, etc.).

The system memory 190, which implements the cache 196 and associated data structures 192 and 194, may comprise any suitable volatile and/or non-volatile memory for reading and writing data, such as dynamic random-access memory (DRAM), flash memory, SSD, etc., and other types of "fast access" memory. Depending on the application, the system memory 190 can implement any one of an L1 cache, an L2 cache, an L3 cache, etc.

The I/O handler module 172 implements methods that are configured to perform functions such as receiving, buffering, and handling I/O read requests and/or I/O write requests that are issued by cache clients (e.g., processors, storage control system 150, compute nodes, SDCs, etc.). In some embodiments, such as in a write-cache implementation, all I/O write requests issued by cache clients may be cached. In other embodiments, the I/O handler 172 may intercept all I/O requests and make a determination as to whether or not a given I/O request is to be cached. In other embodiments, the storage control system 150 or server operating system determines which I/O requests are to be handled by the cache management module 170 and cached.

The hashing module 174 implements methods that are configured to perform hashing operations (e.g., dynamically, statically, etc.) to generate indexes (or hash codes) that are used to perform lookup operations (via a key) in the associative container 194. For example, when an I/O request is received, certain metadata associated with the I/O request (e.g., a logical block address (LBA) range, an LBA, or portion thereof) is extracted and input as a "key" to the hashing module 174, wherein the key is processed using a given hashing function to generate a hash index associated with the key. This hash index will be used to perform a cache lookup operation in the associated container 194 using known techniques.

The associative container manager module 178 is configured to implement and manage the associative container 194 in the memory 190. The associative container 194 can be implemented using any type of associative array data structure that allows a lookup of a cache entry of the cache 196 and an element (e.g., list element) inside the sequence container 192 (e.g., linked list). The associative container 194 can be, for example, a hash table data structure which allows a constant time (O(1) time) lookup, or some other suitable binary tree data structure such as a Red-Black tree, an AVL-tree, a B-tree, etc., that allows a O(Log(N)) lookup time, or an otherwise sufficiently fast lookup time as may be desired for the given application.

The sequence container manager module 176 is configured to implement and manage the sequence container 192. In some embodiments, the sequence container 192 is implemented using a linked list data structure, e.g., a doubly linked list, which comprises a sequence of list elements (alternatively referred to as list nodes) wherein each linked list element corresponds to a cache entry for a given cache.

In a conventional LRU cache implementation, a linked list data structure will contain a list element for each existing cache entry, wherein an allocated maximum number of allowed list elements L for a given linked list will be equal to an allocated maximum number of allowed cache entries C for the given cache (i.e., L=C). In this conventional LRU implementation, when the linked list is fully populated with L list elements corresponding to C entries, the linked list will include (i) a list element at a "head" end of the linked list which corresponds to a most recently used (MRU) cache entry, (ii) a list element at a "tail end" of the linked list which corresponds to the LRU cache entry, and (iii) a sequence of list elements between the head list element and the tail list element which correspond to all other remaining cache entries C and their sequential order of previous accesses of the list elements. When an existing cache entry is accessed, the corresponding link list element for that cache entry is moved to the head end of the linked list (if it is not already there). When an existing cache entry is to be evicted to make room for a new cache entry (after a cache miss), the LRU cache entry corresponding to the LRU list element in the linked list is evicted to make room for the new cache entry, and a linked list element for the new cache entry is added to the linked list as the head list element such that the new cache entry is deemed the MRU cache entry.

The conventional implementation of the LRU linked list which requires the number of list elements L to be equal to the number of cache elements C (i.e., L=C) can lead to the inefficient utilization of memory in certain use cases. For example, as noted above, while a conventional LRU linked list where L=C is used to track MRU and LRU cache entries and evict LRU entries when needed, such eviction mechanism is effective in cases where the cached data (e.g., data records, pages, etc.) are sufficiently large as compared to the overhead (in terms of memory size) required to maintain the full LRU linked list. However, such overhead becomes significantly costly in terms of memory utilization when the size of the cached data records is significantly small in comparison to the size of the memory required to maintain metadata associated with the LRU linked list.

For example, in certain cache implementations where the cached data comprises small data records (e.g., metadata) that have sizes on the order of several bytes (e.g., 2-8 bytes), the sizes of the metadata needed to maintain the linked list data structure (e.g., next and previous pointers) may be comparable to the size of the cached data records. For example, the pointers that are used for the list elements of a linked list can be on the order of 8 bytes each, which equates to 16 bytes for each list element with previous and next pointers in a doubly linked list. In addition, each linked list element may include a data field which includes a pointer to cached data (which has a size of, e.g., 8 bytes). In this example, a linked list element may require 24 bytes of memory, while the cache data records are 8 bytes in size (e.g., each linked list element is about 3× the size of each the cached data record).

In this regard, in use cases where the size of each cached element is small, e.g., comparable to or even less than the size of the list element, then the memory footprint of LRU sequence container would be comparable to cache size, effectively reducing it by 2 or more. To address this issue of inefficient memory utilization, the exemplary techniques discussed herein for managing an LRU cache memory implement a smaller-sized linked list in which the allocated maximum number of allowable list elements L is less than the allocated maximum number of allowed cache entries C (i.e., L<C). For example, in some embodiments, L=C/x where x is in a range of about 200 to about 1000, depending on the application. The smaller list of size L would have a much smaller memory footprint, and would be configured to track and evict L entries which are "old enough" but not necessarily the oldest entries, on best effort basis. In other words, instead of maintaining the complete ranked list of all cached elements (L=C), we maintain a much shorter list (L<C) of "near cold" elements. The smaller number of list elements (L<C) provides a tradeoff between keeping the cache memory sufficiently large, and having to know exactly which cache entry is the actual LRU cache entry among all cache entries C. Such an approach is especially useful for write cache of metadata in storage systems, where each cached element is relatively small.

As noted above, in some embodiments, L=C/x where x is in a range of about 200 to about 1000, depending on the application and the amount of available memory. For example, assuming we have a cache data size of 8 bytes and list node size of 24 bytes (e.g., 16 bytes for Prev and Next, and 8 bytes for the data pointer). Assume further that we have 24 GB of memory for the cache and/or the linked list, without a lookup table, then 24 GB would provide 1 GB list elements. If we have 1 M list elements (i.e. 1/~1000), which take 24 MB, then we have more than 23 GB available for data and still a sufficiently large "near-cold" number L of list elements.

Figure 2:
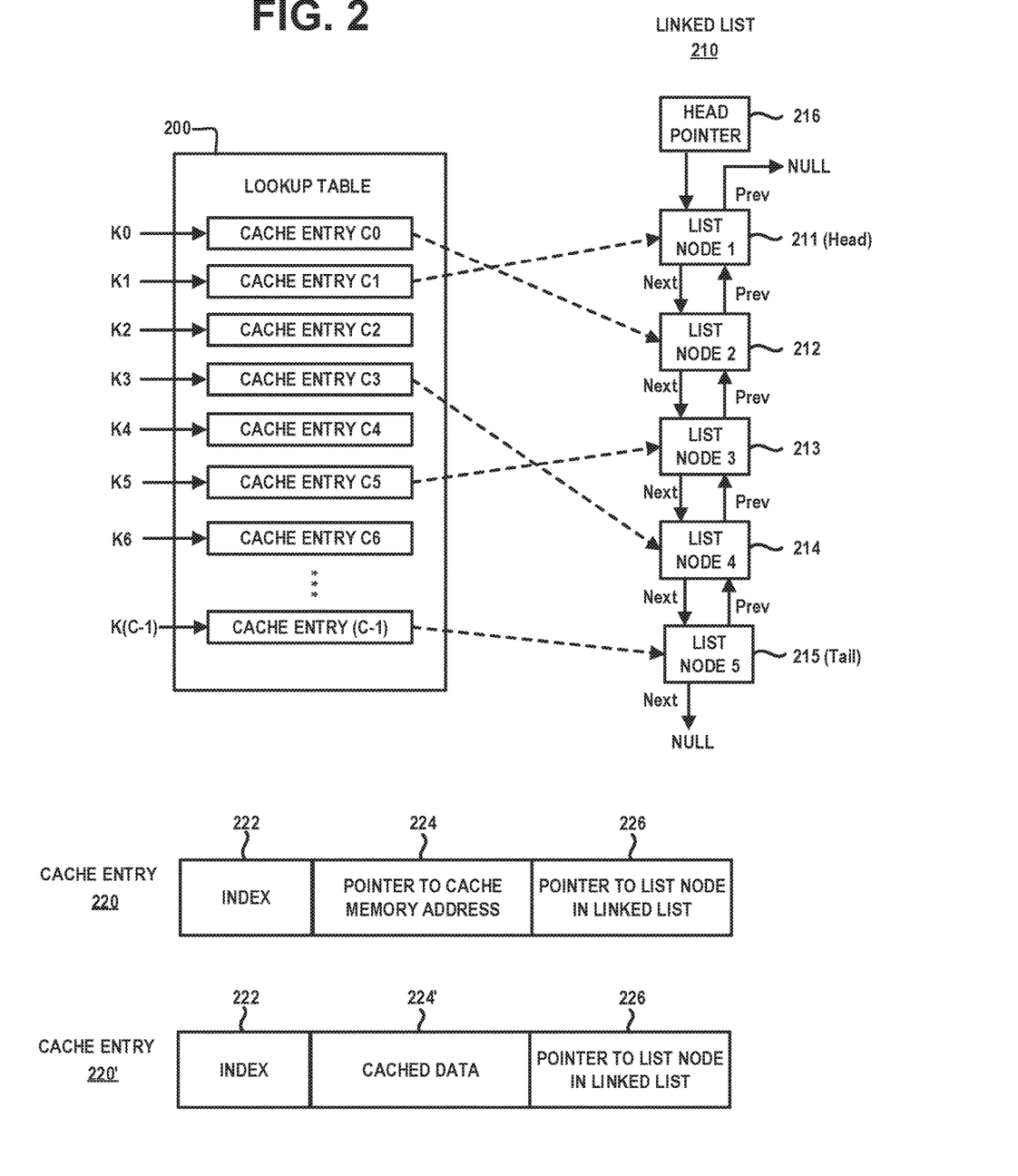
FIG. 2 schematically illustrates a process managing an LRU cache memory using a low memory footprint sequence container, according to an exemplary embodiment of the disclosure.

FIG. 2 schematically illustrates a process managing an LRU cache memory using a low memory footprint sequence container, according to an exemplary embodiment of the disclosure. In particular, FIG. 2 schematically illustrates an exemplary associative container 200, an exemplary linked list 210, and exemplary embodiments of cache entries 220 and 220'. The associative container 200 comprises a hash lookup table comprising a plurality (C) of cache entries C0, C1 C2, C3, C4, C5, C6, . . . , (C−1), generally referred to as cache entries C. Each cache entry C0, C1, C2, C3, C4, C5, C6, . . . , (C−1) comprise comprises a cache entry index (e.g., hash index) which corresponds to a unique key K0, K1, K2, K3, K4, K5, K6, . . . , K(C−1), respectively, which is used to perform a cache lookup operation using known techniques. In some embodiments, the cache entries may contain the entire key as well, so it is possible that the cache index for a given cache entry actually includes the corresponding key.

The linked list 210 comprises a doubly linked list data structure with a head pointer 216 and a set of L sequentially linked list nodes 211, 212, 213, 214 and 215. In the exemplary embodiment of FIG. 2, for purposes of discussion, it assumed that the allocated maximum number L of allowed list nodes is 5 (L=5) and L<C. Each list node 211, 212, 213, 214 and 215 comprises three fields—two fields that include a Prev pointer that points to a previous list node and a Next pointer that points to a next list node in the sequence of list nodes 211, 212, 213, 214 and 215. In addition, each list node include a third field which includes, e.g., a pointer to cached data of the cache entry which corresponds to the given list node, or a key of the cache entry which corresponds to the given list node. The list node 211 is deemed the head list node as it is pointed to by the head pointer 216 and has a null pointer as its Prev pointer. The list node 215 is deemed the tail list node as it has a null pointer as its Next pointer.

FIG. 2 further illustrates alternate exemplary embodiments of cache entry data structures 220 and 220' for implementing the cache entries C0, C1 C2, C3, C4, C5, C6, . . . , (C−1) in the associative container 200. In particular, the exemplary cache entry 220 has three fields including (i) a cache entry index field 222 to store an index for the given cache entry (which is mapped to a respective key), (ii) a pointer field 224 to store a pointer to a cache memory address which contains the associated cached data, and (iii) a pointer field 226 to store a pointer to a list node in a linked list, which is associated with the cache entry.

The second cache entry 220' has a data structure that is similar to the first cache entry 200 except that the second cache entry 220' includes a field 224' to store the actual cache data (instead of a pointer to cache memory address of the cache data). In this embodiment, the associative container 200 incorporates the cache memory block in addition to the cache lookup data structure, such that the cache lines of the cache memory block 196 shown in FIG. 2 would be part of the associative container 194, and not pointed to by the associative container 194. This implementation is particularly useful in instances where the cached data blocks (e.g., data records, metadata) are relatively small in size (e.g., 8 bytes).

In the exemplary embodiment of FIG. 2, it is assumed the linked list 210 is fully populated with L=5 list nodes, wherein the list nodes 211, 212, 213, 214 and 215 are associated with respective cache entries C1, C0, C5, C3 and C−1, as indicated by the dashed arrows representing pointers (e.g., pointers 226) in the cache entries that point to corresponding list nodes in the linked list 210. In the illustrative state shown in FIG. 2, the list node 215 (corresponding to cache entry C−1) is currently the tail node in the linked list 210 and the list node 211 (corresponding to cache entry C1) is currently the head node in the linked list 210.

But in contrast to a conventional LRU scheme, the head list node 211 in the linked list 210 does not actually represent the MRU cache entry in the lookup table 200, and the tail list node 215 in the linked list 210 does not actually represent the LRU cache entry in the lookup table 200. Instead, the L=5 list nodes 211, 212, 213, 214, and 215 correspond to 5 different cache entries (e.g., L cache entries out of C cache entries) entries which are approximated to be "near cold" cache entries, wherein an eviction of a given cache entry associated with the tail list node 215 means that the given cache entry was not accessed in at least the last L number of times that the cache was accessed. Moreover, a given cache entry associated with the head list node 211 means that the given cache entry is simply the "least cold" of all the cache entries currently associated with the list nodes in the linked list 210, and a given cache entry associated with the tail list node 215 means that the given cache entry is simply the "coldest" of all the cache entries that are currently associated with the list nodes in the linked list 210. Eventually, the cache entry associated with the head list node 211 will move down the linked list toward the tail list node 215 and eventually be evicted if such each entry is not accessed in the next L cache access operations.

Figure 3A:
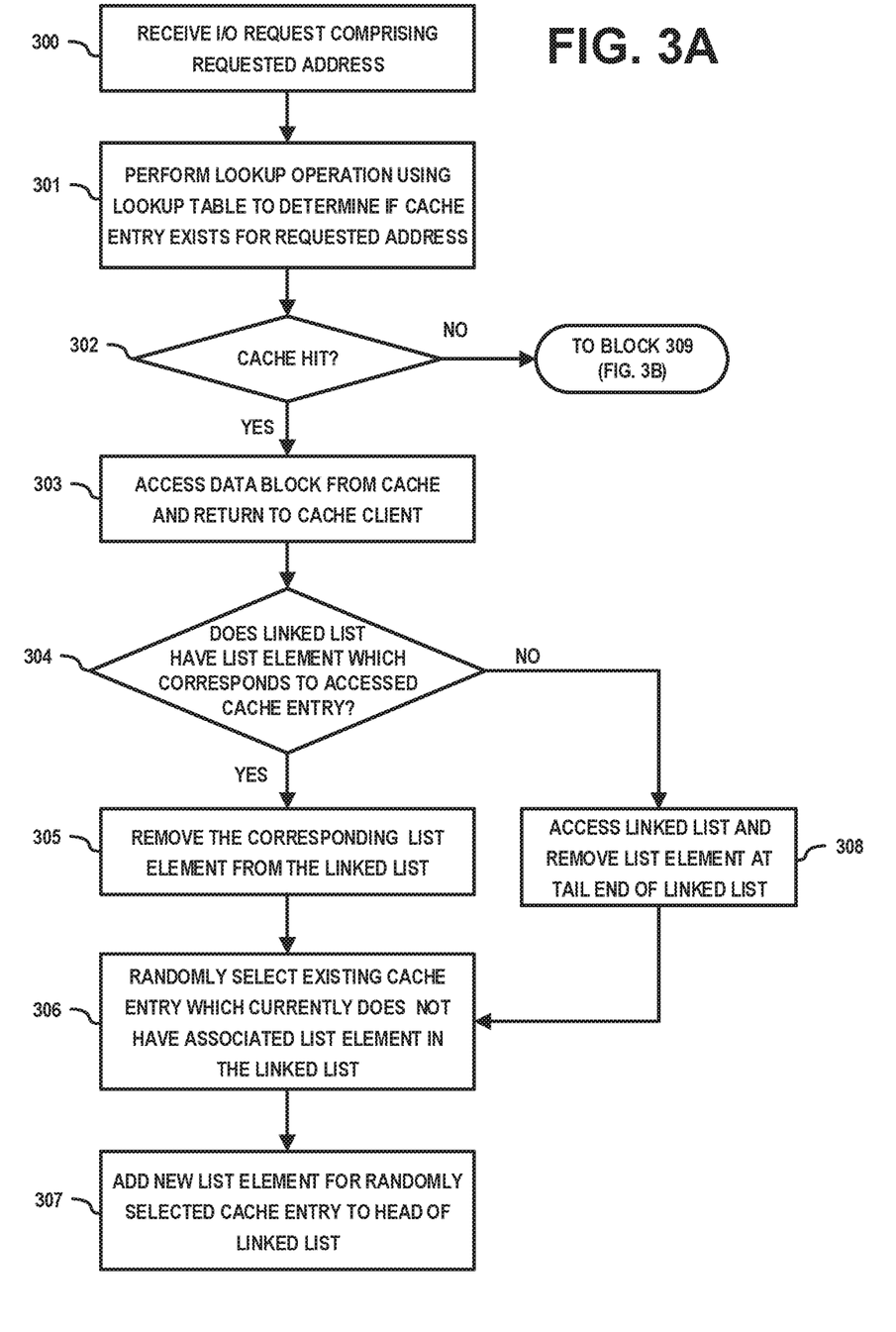
FIGS. 3A and 3B illustrate a flow diagram of a method for managing an LRU cache memory using a low memory footprint sequence container, according to an exemplary embodiment of the disclosure.
Figure 3B:
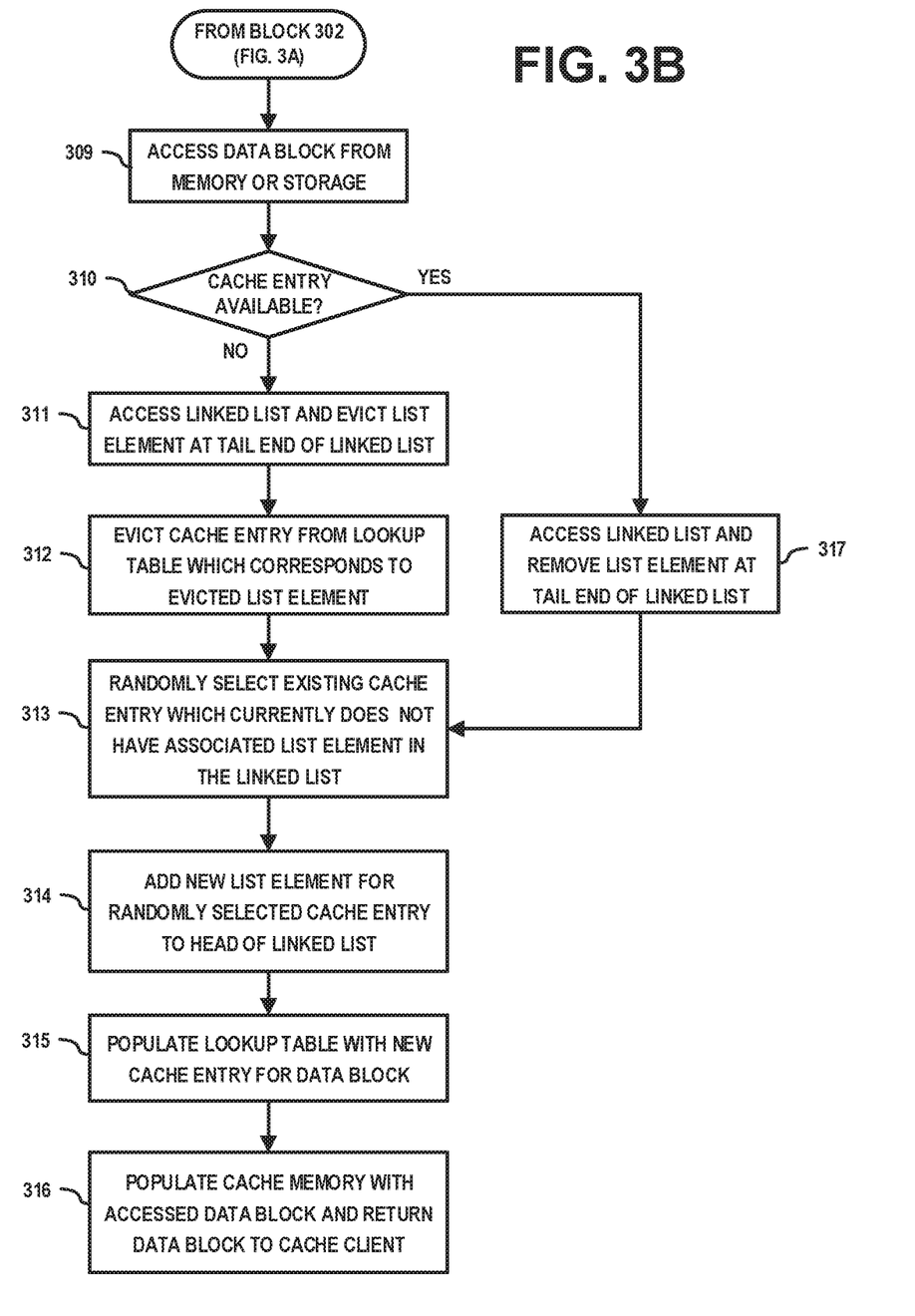

FIGS. 3A and 3B illustrate a flow diagram of a method for managing an LRU cache memory using a low memory footprint sequence container, according to an exemplary embodiment of the disclosure. In particular, the process flow of FIGS. 3A and 3B illustrate a method that is implemented by the cache management module 170 (FIG. 1B) for managing cache access operations with cache memory that has been an allocated a maximum number C of allowable cache entries, and a linked list (e.g., double linked list) that has been allocated a maximum number L of allowable list nodes, wherein L<C. Furthermore, for purposes of discussion, the process flow begins with the assumption that the linked list is fully populated with L list elements (list nodes) and that a cache operation is performed in response to an I/O read request.

Referring to FIG. 3A, the cache management module 170 received an I/O request comprising a target address (e.g., LBA) associated with the I/O request and other possible metadata, e.g., volume ID (block 300). A cache lookup operation is performed using a lookup table to determine if a cache entry exists for the requested address (block 301). For example, in some embodiments, the cache lookup operation is performed by using the target address (or a portion thereof) or some other associated metadata of the received I/O request as a key, hashing the key to obtain a cache index (hash index) and then using the cache index to look for an existing cache entry in the lookup table which comprises the computed cache index.

If a cache entry exists which corresponds to the requested address, i.e., there is a "cache hit" (affirmative determination in block 302), the cached data block associated with the cache entry is accessed from cache memory and returned to the requesting cache client (block 303). A determination is then made as to whether the linked list (sequence container) includes a list element which corresponds to the accessed cache entry (block 304). For example, in some embodiments, this determination is made by looking at the value of the field 226 (FIG. 2) in the cache entry to determine if there is a pointer to a list element in the linked list or there is a null pointer. If it is determined that the linked list does have a list element which corresponds to the accessed cache entry (affirmative determination in block 304), the process will proceed to "remove" the corresponding list element from the linked list (block 305). For example, the pointer field 226 (FIG. 2) of the accessed cache entry will be populated with a null pointer.

In this instance, the list element is removed from the linked list because the recently accessed cache entry is no longer deemed to be a "cold" cache entry. Instead, at this time, the cache entry can be considered the MRU cache entry. In this regard, it is to be noted that the term "removing" or "removal" (or the like) of a list element from the linked list simply means that the list element corresponding to the recently accessed cache entry is removed from the linked list, but not that the cache entry is removed or otherwise evicted.

Next, since there is one less list element in the linked list (L−1) that is associated with a cache entry, the process proceeds to (i) randomly select an existing cache entry which currently does not have an associated list element in the linked list (block 306) and then (ii) add a list element for the randomly selected cache entry into the head position of the linked list (block 307). In this process, the linked list will now have L entries corresponding to cache entries that are approximated to be near cold elements, with the newly added cache entry being considered the "least cold" cache entry of all the other cache entries that are currently associated with the other list elements in the linked list. The randomly selected cache entry can be added into the linked list by updating the pointer field 226 of the randomly selected cache entry to include a pointer to the head list element in the linked list.

On the other hand, returning to block 304, if it is determined that the linked list does not have a list element which corresponds to the accessed cache entry (negative determination in block 304), the process will proceed to "remove" the list element that is currently at the tail end of the linked list (block 308). For example, in this process, the pointer field 226 (FIG. 2) of the cache entry that is associated with the removed tail list element will be populated with a null pointer. Following removal of the tail list element, the process proceeds to (i) randomly select an existing cache entry which currently does not have an associated list element in the linked list (block 306) and then (ii) add a list element for the randomly selected cache entry into the head position of the linked list (block 307). In this instance, the cache entry that corresponds to the removed tail element is not removed or evicted from the cache, rather this process serves to cycle the linked list and move an existing cache entry in the linked list to the tail position while adding a randomly selected cache entry (assumed to be cold) to the head position, as opposed to keeping the linked list static with the same cache entries.

Referring back to block 302, if it is determined that a cache entry does not exist which corresponds to the requested address, i.e., a "cache miss" (negative determination in block 302), the process flow proceeds to block 309 in FIG. 3B. Referring now to FIG. 3B, in response to the cache miss, the cache management module 170 will proceed to access the data block at the target address provided with the I/O request (block 309). The data block can be accessed from a lower level system memory (e.g., a lower cache level) or from a storage device (e.g., HDD). It is to be understood that in some embodiments, the data access operation (block 309) will be performed at a later stage in the cache access operation, such as when it comes time to populate the cache memory with the accessed data block (which results in one memory copy operation as opposed to two). The process flow will depend on the cache management processes flow that is implemented.

A determination is then made as to whether a cache entry is available for the newly accessed data (block 310). For example, if the number of existing cache entries for the cache memory is equal to the allocated maximum number C of cache entries, then it will be deemed that no cache entry is available for the newly accessed data (negative determination in block 310). In this instance, the process proceeds to (i) access the linked list and evict the list element at the tail end of the linked list (block 311) and then evict the cache entry from the lookup table which corresponds to the evicted list element (block 312). In this instance, "eviction" of a list element from the linked list means that the list element and the associated cache entry are evicted from the cache. When the evicted cache entry is "dirty data" that was previously written to the cache (for a write cache implementation), the evicted cache data will be de-staged (i.e., written back to its location in lower memory or storage).

Next, since there is one less list element in the linked list (L−1) that is associated with a cache entry, the process proceeds to (i) randomly select an existing cache entry which currently does not have an associated list element in the linked list (block 313) and then (ii) add a list element for the randomly selected cache entry into the head position of the linked list (block 314). In this process, the linked list will now have L entries corresponding to cache entries that are approximated to be near cold elements, with the newly added cache entry being considered the "least cold" cache entry of all the other cache entries that are currently associated with the other list elements in the linked list. The randomly selected cache entry can be added into the linked list by updating the pointer field 226 of the randomly selected cache entry to include a pointer to the head list element in the linked list.

The process then proceeds to populate the lookup table with the new cache entry for the data block (block 315) and the cache memory is populated with the accessed data block and the data block is returned to the requesting cache client (block 316). It is to be noted that when the new cache entry is added to the lookup table, the list node pointer field 226 is populated with a null pointer. In this case, in contrast to a conventional LRU scheme, a list element of the newly added cache entry is not added to the head position of the linked list. Again, since the new cache entry in this instance is deemed the MRU cache entry, it will not be added to the list of L "near cold" elements maintained by the linked list.

Referring back to block 310, if the number of existing cache entries for the cache memory is not equal to the allocated maximum number C of cache entries, then it will be deemed that a cache entry is available for the newly accessed data (affirmative determination in block 310). In this instance, the process will proceed to "remove" the list element that is currently at the tail end of the linked list (block 317 and then proceed to execute the process steps discussed above for blocks 313, 314, 315 and 316). Again, in this instance, the cache entry that corresponds to the removed tail element is not removed or evicted from the cache, rather this process serves to cycle the linked list and move an existing cache entry in the linked list to the tail position while adding a randomly selected cache entry (assumed to be cold) to the head position, as opposed to keeping the linked list static with the same cache entries.

The well-known LRU algorithm provides a strong guarantee about element ranking, but requires memory of size O(N), where N is the number of list elements in a linked list. If the size of a cached element is similar to the size of memory required to maintain the element in the linked list, the effective cache size is reduced by factor of 2. A novelty of the LRU cache management methods discussed above in conjunction with FIGS. 2, 3A and 3B is that it allows a fine tuning of memory consumption, based on performance impact of cache miss and/or eviction latency.

For example, suppose we have a memory of size M for cache and the cache is implemented with an LRU replacement policy, where each cached element is of the same size E as list element. Suppose also that serving cache hit request is 1000 times faster (T), than serving cache miss request and the data set of size D twice the size of the cache. The number of elements in LRU cache, thus would be:

$$N[LRU]=M/(E*2)(E \text{ memory for cache and } E \text{ to have it in list);}$$

$$P[LRU \text{ hit}]=N/D=N/(2*N)=0.5; \text{ and the average latency is:}$$

$$LRU \text{ average latency}=0.5*T+(1-0.5)*1000T=1001*T/2.$$

The proposed algorithm with list size L would have 2*N−L cache entries, therefore the probability of cache hit would be:

$$P=(2*N-L)/D=(2*N-L)/(2*N)=1-L/(2*N).$$

If we choose L=N/1000, then the probability would be:

$$P=1-(N/1000)/(2*N)=1-\tfrac{1}{2000}=0.95.$$

Thus, the average latency would be: L=0.95*T+0.05*1000 T=50.95 T.

It is to be understood that while exemplary embodiment are discussed herein in the context of an LRU cache eviction policy, the reduced memory footprint techniques may be extended to other types of cache eviction policies, such as Least Frequently Used (LFU) that implement certain data structures such as linked lists for tracking the hotness and/or coldness of cache elements. Such policies might have different types of containers, not necessarily a linked list. For example, for an LFU cache, a min-heap data structure is typically utilized. However, the techniques disclosed herein may be extended to decrease the size of min-heap to be significantly smaller than the cache size. Another replacement policy is LFRU, which is a combination of LRU and LFU.

Figure 4:
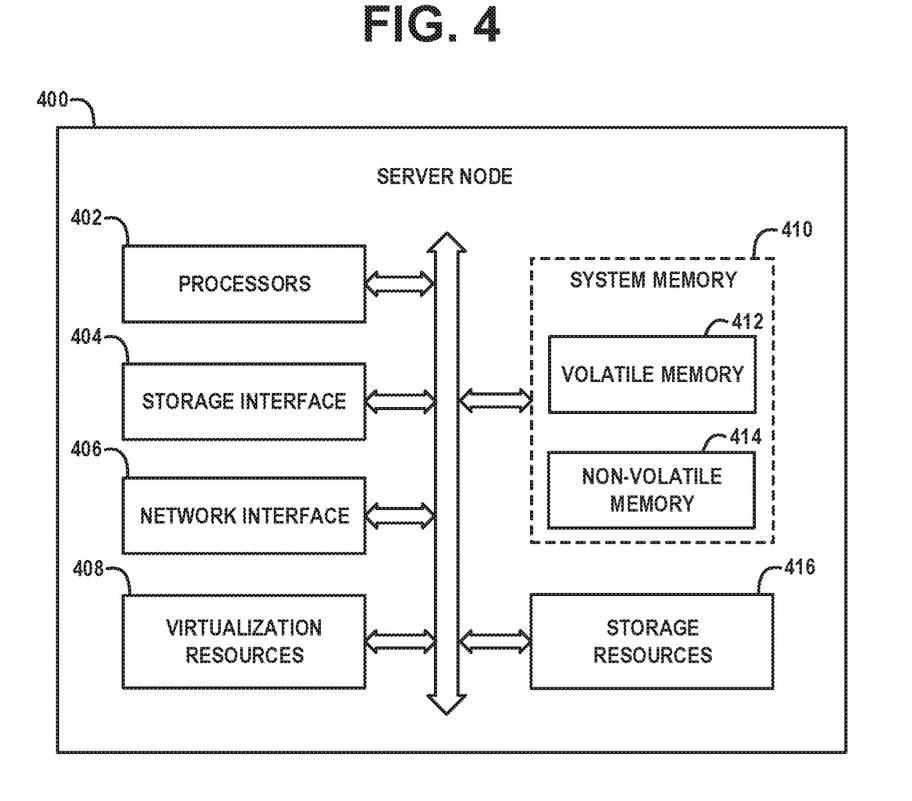
FIG. 4 schematically illustrates framework of a server node for implementing a storage node which hosts a data storage system which is configured to manage an LRU cache memory using a low memory footprint sequence container, according to an exemplary embodiment of the disclosure.

FIG. 4 schematically illustrates framework of a server node which hosts a data storage system that is configured to manage storage device errors during processing of an inflight I/O operations, according to an exemplary embodiment of the disclosure. More specifically, FIG. 4 schematically illustrates framework of a server node 400 (e.g., storage node 140, FIGS. 1A and 1B) which can be implemented for hosting a storage control system (e.g., the storage control system 150, FIG. 1B), according to an exemplary embodiment of the disclosure. The server node 400 comprises processors 402, storage interface circuitry 404, network interface circuitry 406, virtualization resources 408, system memory 410, and storage resources 416. The system memory 410 comprises volatile memory 412 and non-volatile memory 414.

The processors 402 comprise one or more types of hardware processors that are configured to process program instructions and data to execute a native operating system (OS) and applications that run on the server node 400. For example, the processors 402 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 404 enables the processors 402 to interface and communicate with the system memory 410, the storage resources 416, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 406 enables the server node 400 to interface and communicate with a network and other system components. The network interface circuitry 406 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 408 can be instantiated to execute one or more services or functions which are hosted by the server node 400. For example, the virtualization resources 408 can be configured to implement the various modules and functionalities of the storage control system 150 as shown in FIG. 1B as discussed herein. In one embodiment, the virtualization resources 408 comprise virtual machines that are implemented using a hypervisor platform which executes on the server node 400, wherein one or more virtual machines can be instantiated to execute functions of the server node 400. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 400, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 408 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 400 as well execute one or more of the various modules and functionalities of the storage control system 150 of FIG. 1B as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the various components, systems, and modules of the storage control system 150 and cache management module 170 comprise program code that is loaded into the system memory 410 (e.g., volatile memory 412), and executed by the processors 402 to perform respective functions as described herein. In this regard, the system memory 410, the storage resources 416, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 410 comprises various types of memory such as volatile RAM, NVRAM, or other types of memory, in any combination. The volatile memory 412 may be a dynamic random-access memory (DRAM) (e.g., DRAM DIMM (Dual In-line Memory Module), or other forms of volatile RAM. The non-volatile memory 414 may comprise one or more of a NAND Flash storage device, an SSD device, or other types of next generation non-volatile memory (NGNVM) devices. The system memory 410 can be implemented using a hierarchical memory tier structure wherein the volatile system memory 412 is configured as the highest-level memory tier, and the non-volatile system memory 414 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). In an exemplary embodiment, system memory 410 comprises the system memory 190 shown in FIG. 1B.

The term "memory" or "system memory" as used herein refers to volatile and/or non-volatile system memory which is utilized to store application program instructions that are read and processed by the processors 402 to execute a native operating system and one or more applications or processes hosted by the server node 400, and to temporarily store data that is utilized and/or generated by the native OS and application programs and processes running on the server node 400. The storage resources 416 can include one or more HDDs, SSD storage devices, etc. In an exemplary embodiment, the storage resources 416 include the storage devices 180 shown in FIG. 1B.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
receiving, by a cache management system, an input/output (I/O) request comprising a target address for accessing data, wherein the cache management system manages a cache memory having a maximum allocated amount of cache entries, and a linked list data structure having a maximum allocated amount of list elements, wherein the maximum allocated amount of list elements is less than the maximum allocated amount of cache entries;
commencing, by the cache management system, a cache access operation to determine whether the target address corresponds to a cache entry; and
in response to determining that the target address does correspond to a cache entry;
accessing, by the cache management system, the cache entry to obtain cache data from cache memory and returning the obtained cache data to a requesting cache client;
removing, by the cache management system, a list element from the linked list data structure, wherein the removed list element corresponds to the accessed cache entry;
selecting, by the cache management system, an existing cache entry which currently does not have a corresponding list element in the linked list data structure; and
adding, by the cache management system, a list element to a head position of the linked list data structure which corresponds to the selected cache entry.

2. The method of claim 1, wherein selecting the existing cache entry comprises randomly selecting an existing cache entry which currently does not have a corresponding list element in the linked list data structure.

3. The method of claim 1, wherein in response to determining that the target address does correspond to a cache entry, the method further comprising:
determining, by the cache management system, whether the linked list data structure comprises a list element which corresponds to the accessed cache entry; and
in response to determining that the linked list data structure does not comprise a list element which corresponds to the accessed cache entry, the cache management system:
removing a list element at a tail position of the linked list data structure;
randomly selecting an existing cache entry which currently does not have a corresponding list element in the linked list data structure; and
adding a list element to the head position of the linked list data structure which corresponds to the randomly selected cache entry.

4. The method of claim 1, wherein in response to the cache management system determining that the target address of the I/O request does not correspond to a cache entry, the method further comprising:
determining, by the cache management system, whether there is an unused cache entry available to service the I/O request, and in response to determining that an unused cache entry is not available;
evicting, by the cache management system, a list element at a tail position of the linked list data structure;

evicting, by the cache management system, a cache entry which corresponds to the evicted list element;

randomly selecting, by the cache management system, an existing cache entry which currently does not have a corresponding list element in the linked list data structure; and adding, by the cache management system, a list element to the head position of the linked list data structure which corresponds to the randomly selected cache entry.

5. The method of claim 4, wherein in response to determining that an unused cache entry is not available, the method further comprising:

adding a new cache entry associated with the I/O request;

accessing data associated with the I/O request from one of a storage device and another cache memory; and adding to the new cache entry a null pointer to the linked list data structure.

6. The method of claim 4, further comprising destaging cache data associated with the evicted cache entry to one of another cache memory and a storage device.

7. The method of claim 4, wherein in response to the cache management system determining that an unused cache entry is available, the method further comprising:

removing a list element at the tail position of the linked list data structure;

randomly selecting an existing cache entry which currently does not have a corresponding list element in the linked list data structure; and adding a list element to the head position of the linked list data structure which corresponds to the randomly selected cache entry.

8. The method of claim 1, wherein the cache memory comprises a write cache memory that is configured to store data records, wherein a size of each data record is less than a total size of metadata that is stored in data fields of a single list element.

9. The method of claim 1, wherein the maximum allocated amount of list elements is in a range of about 1/1000 to about 1/200 of the maximum allocated amount of cache entries.

10. An article of manufacture comprising a non-transitory processor-readable storage medium having stored therein program code of one or more software programs, wherein the program code is executable by one or more processors to implement a method comprising:

receiving, by a cache management system, an input/output (I/O) request comprising a target address for accessing data, wherein the cache management system manages a cache memory having a maximum allocated amount of cache entries, and a linked list data structure having a maximum allocated amount of list elements, wherein the maximum allocated amount of list elements is less than the maximum allocated amount of cache entries;

commencing, by the cache management system, a cache access operation to determine whether the target address corresponds to a cache entry; and in response to determining that the target address does correspond to a cache entry;

accessing, by the cache management system, the cache entry to obtain cache data from cache memory and returning the obtained cache data to a requesting cache client;

removing, by the cache management system, a list element from the linked list data structure, wherein the removed list element corresponds to the accessed cache entry;

selecting, by the cache management system, an existing cache entry which currently does not have a corresponding list element in the linked list data structure; and adding, by the cache management system, a list element to a head position of the linked list data structure which corresponds to the selected cache entry.

11. The article of manufacture of claim 10, wherein selecting the existing cache entry comprises randomly selecting an existing cache entry which currently does not have a corresponding list element in the linked list data structure.

12. The article of manufacture of claim 10, wherein in response to determining that the target address does correspond to a cache entry, the method further comprising:

determining, by the cache management system, whether the linked list data structure comprises a list element which corresponds to the accessed cache entry; and in response to determining that the linked list data structure does not comprise a list element which corresponds to the accessed cache entry, the cache management system:

removing a list element at a tail position of the linked list data structure;

randomly selecting an existing cache entry which currently does not have a corresponding list element in the linked list data structure; and adding a list element to the head position of the linked list data structure which corresponds to the randomly selected cache entry.

13. The article of manufacture of claim 10, wherein in response to the cache management system determining that the target address of the I/O request does not correspond to a cache entry, the method further comprising:

determining, by the cache management system, whether there is an unused cache entry available to service the I/O request, and in response to determining that an unused cache entry is not available;

evicting, by the cache management system, a list element at a tail position of the linked list data structure;

evicting, by the cache management system, a cache entry which corresponds to the evicted list element;

randomly selecting, by the cache management system, an existing cache entry which currently does not have a corresponding list element in the linked list data structure; and adding, by the cache management system, a list element to the head position of the linked list data structure which corresponds to the randomly selected cache entry.

14. The article of manufacture of claim 13, wherein in response to determining that an unused cache entry is not available, the method further comprising:

adding a new cache entry associated with the I/O request;

accessing data associated with the I/O request from one of a storage device and another cache memory; and adding to the new cache entry a null pointer to the linked list data structure.

15. The article of manufacture of claim 13, wherein in response to the cache management system determining that an unused cache entry is available, the method further comprising:

removing a list element at the tail position of the linked list data structure;

randomly selecting an existing cache entry which currently does not have a corresponding list element in the linked list data structure; and adding a list element to the head position of the linked list data structure which corresponds to the randomly selected cache entry.

16. An apparatus, comprising:

at least one processor; and system memory configured to store program code, wherein the program code is executable by the at least one processor to implement a storage control system which is configured to:

receive an input/output (I/O) request comprising a target address for accessing data, wherein the cache management system manages a cache memory having a maximum allocated amount of cache entries, and a linked list data structure having a maximum allocated amount of list elements, wherein the maximum allocated amount of list elements is less than the maximum allocated amount of cache entries;

commence a cache access operation to determine whether the target address corresponds to a cache entry; and in response to determining that the target address does correspond to a cache entry;

access the cache entry to obtain cache data from cache memory and returning the obtained cache data to a requesting cache client;

remove a list element from the linked list data structure, wherein the removed list element corresponds to the accessed cache entry;

select an existing cache entry which currently does not have a corresponding list element in the linked list data structure; and add, by the cache management system, a list element to a head position of the linked list data structure which corresponds to the selected cache entry.

17. The apparatus of claim 16, wherein in selecting the existing cache entry the cache management system is configured to randomly select an existing cache entry which currently does not have a corresponding list element in the linked list data structure.

18. The apparatus of claim 16, wherein in response to determining that the target address does correspond to a cache entry, the cache management system is further configured to:

determine whether the linked list data structure comprises a list element which corresponds to the accessed cache entry; and in response to determining that the linked list data structure does not comprise a list element which corresponds to the accessed cache entry, the cache management system is configured to:

remove a list element at a tail position of the linked list data structure;

randomly select an existing cache entry which currently does not have a corresponding list element in the linked list data structure; and add a list element to the head position of the linked list data structure which corresponds to the randomly selected cache entry.

19. The apparatus of claim 16, wherein in response to determining that the target address of the I/O request does not correspond to a cache entry, the cache management system is further configured to:

determine whether there is an unused cache entry available to service the I/O request, and in response to determining that an unused cache entry is not available;

evict a list element at a tail position of the linked list data structure;

evict a cache entry which corresponds to the evicted list element;

randomly select an existing cache entry which currently does not have a corresponding list element in the linked list data structure;

add a list element to the head position of the linked list data structure which corresponds to the randomly selected cache entry; and wherein in response to the cache management system determining that an unused cache entry is not available, the cache management system is further configured to:

add a new cache entry associated with the I/O request;

access data associated with the I/O request from one of a storage device and another cache memory; and add to the new cache entry a null pointer to the linked list data structure.

20. The apparatus of claim 19, wherein the cache management system is further configured to destage cache data associated with the evicted cache entry to one of another cache memory and a storage device.

* * * * *